United States Patent [19]

Gallina

[11] 4,297,941
[45] Nov. 3, 1981

[54] MULTIPLE SAUCER SANDWICH COOKING DEVICE

[76] Inventor: Denise Gallina, 68 E. Prospect St., Waldwick, N.J. 07463

[21] Appl. No.: 35,916

[22] Filed: May 4, 1979

[51] Int. Cl.$^3$ .......................................... A47J 37/00
[52] U.S. Cl. ...................................... 99/332; 99/381; 99/388; 99/426; 99/374; 219/524; 426/385
[58] Field of Search ................ 219/524, 525; 426/385, 426/386; 425/385, 386; 99/372, 388, 332, 374, 375, 377, 378, 380, 381, 382, 383, 422, 426, 376, 379, DIG. 14; 101/9

[56] References Cited

U.S. PATENT DOCUMENTS

| | | | |
|---|---|---|---|
| 336,681 | 2/1886 | Witzig | 99/379 |
| 1,520,457 | 12/1924 | Vaughan | 99/381 |
| 1,969,361 | 8/1934 | Fajen | 99/381 |
| 2,450,623 | 10/1948 | Anderson | 99/DIG. 14 |
| 2,483,669 | 10/1949 | Reid | 99/388 |
| 2,587,314 | 2/1952 | Hall | 99/375 |
| 2,791,960 | 5/1957 | Pietropinto | 99/372 |
| 3,008,601 | 11/1961 | Cahne | 99/422 |
| 3,795,183 | 3/1974 | Roth | 99/DIG. 14 |
| 3,946,195 | 3/1976 | Lyons | 101/9 |
| 4,167,900 | 9/1979 | Eichler | 99/375 |

Primary Examiner—Billy J. Wilhite
Attorney, Agent, or Firm—Constantine A. Michalos; Peter C. Michalos

[57] ABSTRACT

A sandwich oven comprising, a base plate having a first plurality of sandwich sized mold indentations therein, a top plate pivotally mounted to said base plate having a second plurality of sandwich sized mold indentations therein, corresponding to said first plurality of indentations in said base plate, and a heating device connected to said top and base plates. The first and second indentations define a plurality of sandwich molds when the top plate is pivoted into its closed position with the base plate. The heating device heats the plurality of sandwich molds causing a sandwich construction therein to be cooked. A timer is connected to the heat means for determining the duration of heating of the molds and a resistive heating element with a selected configuration is provided in the base of each indentation in at least one of the top and base plates. The resistance heating element is energized, causing a branding or marking of the sandwich with the selected configuration.

1 Claim, 4 Drawing Figures

U.S. Patent
Nov. 3, 1981
4,297,941
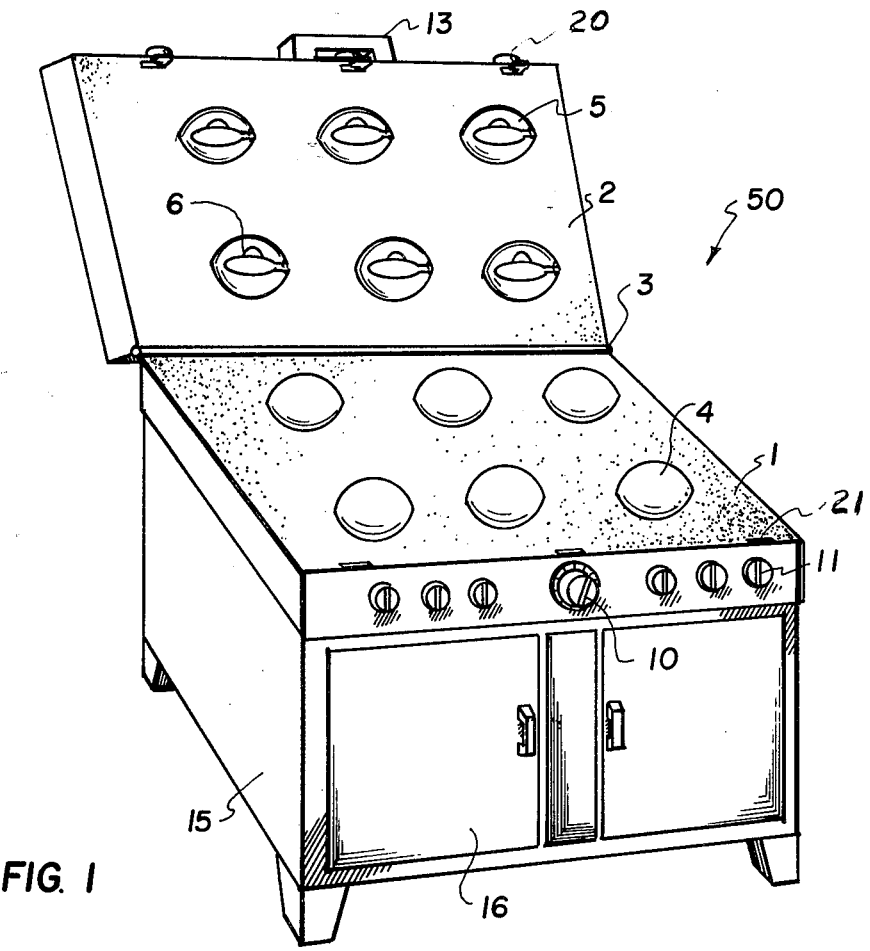
FIG. 1
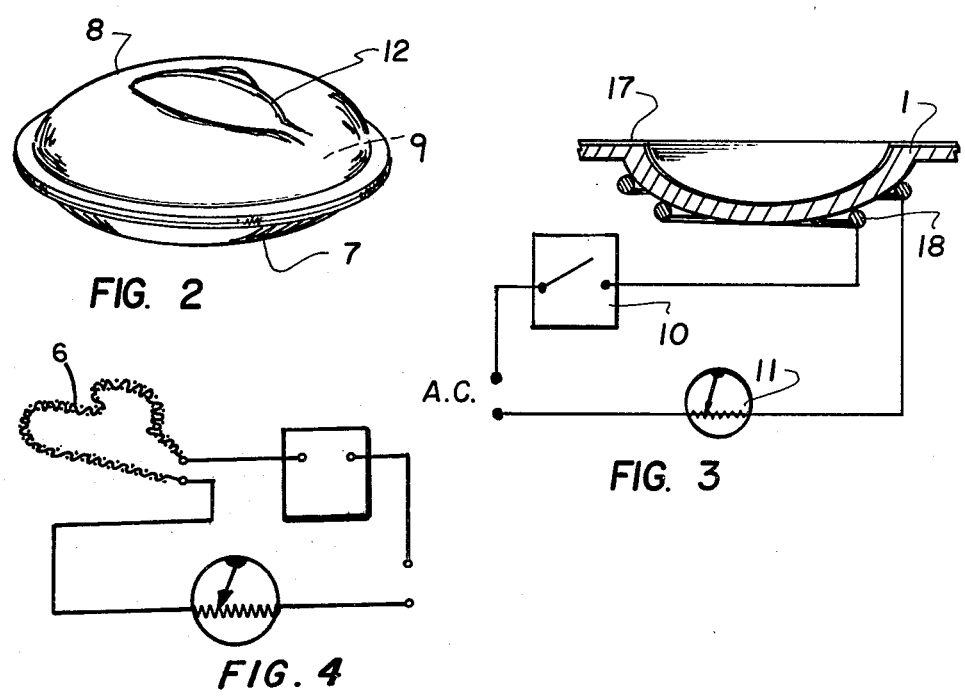
FIG. 2
FIG. 3
FIG. 4

MULTIPLE SAUCER SANDWICH COOKING DEVICE

FIELD AND BACKGROUND OF THE INVENTION

The present invention relates in general to cooking devices and, in particular, to a new and useful sandwich oven which provides a plurality of sandwich molds into which a sandwich assembly consisting, for example, of two pieces of bread with a filling therebetween, can be positioned. Resistive heating elements are provided in each of the molds for branding each sandwich prepared with a selected mark such as a disc shape or desired Trademark.

DESCRIPTION OF THE PRIOR ART

Sandwich makers are known for making, for example, grill cheese sandwiches, which comprise two mold halves which are pivotally connected to each other and include handles. The mold halfs are closed to form a sandwich mold therebetween into which the uncooked grill cheese sandwich assembly is placed. After the mold halves are fastened together the device is exposed to heat, such as that from the top of a stove, in order to cook the grill cheese sandwich therein.

SUMMARY OF THE INVENTION

The present invention relates to a sandwich oven which comprises a base plate having a plurality of indentations which comprise bottom mold halves for accepting an uncooked sandwich assembly. The sandwich assembly may comprise two pieces of dough or bread with a filling therebetween.

A top plate is pivotally mounted to the base plate and includes a second plurality of indentions which correspond in number and position to the first set of indentations so that, when the top plate is pivoted into its closed position with the bottom plate, each pair of indentations form a mold. The sandwich assemblies in each mold are pressed into the shape of the molds which may, for example, take a disc shape or any other desired shape which is adaptable to a sandwich form.

Heating means are provided in the form of resistive or infra-red heating elements or, where the shapes of the molds permit, a microwave heating assembly. A timer may be provided for determining the time that each mold is heated to properly cook each sandwich assembly.

Commercial models may include six or more molds for producing that many sandwiches at a time and a lower cabinet or storage area for storing the materials needed for producing the sandwiches.

Home units may include two or four molds and be of a size small enough to fit on a counter or other surface.

Another feature of the invention includes a provision of a heating element such as a resistive heating wire in the base of the indentations of either the top or base plates so that the sandwich is branded or marked by the configuration of the heating element. The heating element may be shaped in any desired manner, for example, as the Trademark of the sandwich product or shape thereof.

An object of the present invention is thus to provide a sandwich oven for producing a plurality of sandwiches having a selected shape and with a selected marking thereon.

Another object of the present invention is to provide a sandwich oven which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be made to the accompanying drawing and descriptive matter in which there is illustrated a preferred embodiment of the invention.

BRIEF DESCRIPTION OF THE DRAWINGS

In the drawings:

FIG. 1 is a front perspective view of the commercial size sandwich oven having its top plate up to show the mold halves;

FIG. 2 is a front perspective view of a sandwich product produced by the inventive sandwich oven;

FIG. 3 is a schematic view of the heating element used in the invention; and,

FIG. 4 is a schematic view of a second heating element used in the invention.

DESCRIPTION OF THE PREFERRED EMBODIMENTS

Referring now to the drawings in particular, the invention embodied therein comprises a sandwich oven generally designated 50 having a base plate 1 with a top plate 2 pivotally mounted at a pivot joint 3 to the base plate 1. The base plate 1 includes a plurality of sandwich sized mold indentations 4 which may be in a disc shape or other desired shape. The top plate 2 includes a second plurality of sandwich sized mold indentations 5 which, when the top plate 2 is closed onto the base plate 1, form molds therebetween. Each mold indentation 5 of the top plate 2 includes a resistive heating element 6 which may be heated, for example, by applying an electric current thereto and which is any desired shape. The shape shown is that of a disc or the like which suggests the actual shape of the finished product shown in FIG. 2.

In operation, a sandwich assembly comprising a bottom dough or bread portion 7, a top dough or bread portion 8, and a filling 9, is placed into each bottom indentation 4. The timer 10 is set for a desired time, which, through experimentation, corresponds to the time that the sandwich assembly requires for its completion.

Heating means which may be in the form of resistive heating elements, gas burners, or suitably designed microwave assemblies, is connected to the sandwich oven 50 and provided in the base plate 1 or both in the base plate 1 and top plates 2. Each mold may have a corresponding control 11 which controls the heating element associated with that mold. The resistance heating elements 6 may be connected to the main heating unit for the device or have separate controls for branding each sandwich with a brand 12 shown in FIG. 2.

With reference to FIG. 1 it is noted that the top plate 2 is preferably firmly held down by three latch means 20 and 21 shown which advantageously seal the top and bottom sandwich halves together as they are cooked by the heating means.

FIG. 3 shows a schematic representation of the circuit used in one embodiment of the invention which utilizes a resistive heating element 18, which is heated by the passage of electricity from an A.C. electrical source. Timer 10 and and intensity dial 11 are connected in series with the A.C. source and heating element 18 to heat the indented portion of the base plate 1. The base plate and top plate 1 and 2 respectively are preferrably covered with Teflon numbered 17.

FIG. 4 shows another schematic representation of the circuit used in one embodiment of the invention which utilizes a resistive heating element 6, which is heated by the passage of electricity from an A.C. electrical source. Timer 10 and intensity dial 11 are connected in series with the A.C. source and resistance heating element 6 causing a branding or marking of the sandwich with the selected configuration shown in FIG. 2.

After controls 11 and timing selector 10 are positioned, the top plate 2 is pivoted downwardly onto the bottom or base plate 1 by grasping handle 13. After timer 10 indicates that the selected time has expired, the top plate 2 may be lifted to expose the completed sandwich which are now ready to be served.

According to another feature of the invention, a storage cabinet 15, may be provided for supporting the base plate 1 and include an interior storage area which is closed by doors 16 for storing the bread portions 7 and 8 of the sandwich and the fillings 9.

While specific embodiments of the invention have been shown and described in detail to illustrate the application of the principles of the invention, it will be understood that the invention may be embodied otherwise without departing from such principles.

What is claimed is:

1. A multiple saucer sandwich cooking oven comprising, a base plate having a first plurality of sandwich sized mold indentations therein, a top plate pivotally mounted to said base plate having a second plurality of sandwich sized mold indentations therein corresponding to said first plurality of indentations in number and positioning, heating means connected to said top and base plates, said first and second plurality of indentations define a plurality of sandwich molds therebetween when said top plate is pivoted into its closed position with said base plate, whereby said heating means is activated for cooking a sandwich assembly positioned within each of said sandwich molds, a resistance heating element in each of said mold indentations in said top plate having a selected configuration for branding the surface of a sandwich assembly prepared in each of said sandwich molds, said heating means comprising resistance electric heating elements, said mold indentations being in a saucer shape and said resistive heating element being in the shape of a disc, and said heating element further comprising a timer for setting the heating element at a predetermined time thereby cooking the sandwich assembly to a desired degree, and wherein said sandwich molds are coated with Teflon so that the sandwich assembly does not stick to the molds.

* * * * *